United States Patent
Pearce et al.

(10) Patent No.: US 9,882,369 B2
(45) Date of Patent: Jan. 30, 2018

(54) MULTI-LAYER HEAT SHRINKABLE TUBULAR SLEEVE

(71) Applicants: Tyco Electronics Raychem GmbH, Ottobrunn (DE); Tyco Electronics UK Ltd., Swindon Wiltshire (GB)

(72) Inventors: David Francis Pearce, Wiltshire (GB); Richard Graf, Unterschleissheim (DE); Thomas Rohde, Bad Aibling (DE); John David Stoker, Wiltshire (GB); Timothy S. Smith, Wiltshire (GB)

(73) Assignees: Tyco Electronics UK Ltd., Wiltshire (GB); Tyco Electronics Raychem GmbH, Ottobrunn (DE)

( * ) Notice: Subject to any disclaimer, the term of this patent is extended or adjusted under 35 U.S.C. 154(b) by 0 days.

(21) Appl. No.: 14/383,538

(22) PCT Filed: Feb. 27, 2013

(86) PCT No.: PCT/EP2013/053890
§ 371 (c)(1),
(2) Date: Sep. 5, 2014

(87) PCT Pub. No.: WO2013/131789
PCT Pub. Date: Sep. 12, 2013

(65) Prior Publication Data
US 2015/0027578 A1    Jan. 29, 2015

(30) Foreign Application Priority Data

Mar. 6, 2012 (EP) .................................. 12158265

(51) Int. Cl.
*H02G 3/04* (2006.01)
*F16L 55/00* (2006.01)
(Continued)

(52) U.S. Cl.
CPC ..... *H02G 15/1806* (2013.01); *B29C 47/0026* (2013.01); *B32B 27/08* (2013.01);
(Continued)

(58) Field of Classification Search
CPC ............ B29C 47/0026; B29B 2009/00; B32B 2023/00; B32B 2307/704;
(Continued)

(56) References Cited

U.S. PATENT DOCUMENTS 4,085,286 A * 4/1978 Horsma ............... B29C 61/0608
156/273.9
4,163,117 A * 7/1979 Campbell ............. B29C 61/003
138/119
(Continued)

FOREIGN PATENT DOCUMENTS

EP         0522760 A1 *  1/1993  ............ B29C 70/58
EP     1 702 391 B1      7/2007

OTHER PUBLICATIONS

International Preliminary Report on Patentability issued by the International Bureau of WIPO, Geneva, Switzerland, dated Sep. 9, 2014 for International Application No. PCT/EP2013/053890; 5 pages.
(Continued)

*Primary Examiner* — William H Mayo, III
*Assistant Examiner* — Rhadames J Alonzo Miller
(74) *Attorney, Agent, or Firm* — Faegre Baker Daniels LLP (57) ABSTRACT

A multi-layer heat-shrinkable tubular sleeve (100) comprises an outer layer (110) and an inner layer (120). The outer layer (110) is arranged around the inner layer (120). The outer layer (110) comprises a partially crystalline thermoplastic material with a major part of partially crystalline thermoplastic material with a crystallinity of more than
(Continued)

60%. The inner layer (120) comprises a partially crystalline thermoplastic material or an elastomeric material.

19 Claims, 2 Drawing Sheets (51) Int. Cl.
*F16L 11/00* (2006.01)
*F16L 9/00* (2006.01)
*H02G 15/18* (2006.01)
*B32B 27/08* (2006.01)
*B32B 27/28* (2006.01)
*B29C 47/00* (2006.01)
*B29K 101/12* (2006.01)
*B29L 9/00* (2006.01)
*B29L 23/00* (2006.01)

(52) U.S. Cl.
CPC .......... *B32B 27/28* (2013.01); *B29K 2101/12* (2013.01); *B29L 2009/00* (2013.01); *B29L 2023/00* (2013.01); *B32B 2307/206* (2013.01); *B32B 2307/704* (2013.01); *B32B 2307/736* (2013.01); *B32B 2597/00* (2013.01)

(58) Field of Classification Search
CPC .......... B32B 2307/736; B32B 2597/00; B32B 27/08; H02G 15/1806; H02G 15/18

USPC ..................... 174/68.3; 138/137; 264/171.26
See application file for complete search history.

(56) References Cited

U.S. PATENT DOCUMENTS

| | | | |
|---|---|---|---|
| 5,013,894 A * | 5/1991 | Jensen | B29C 61/0625 174/DIG. 8 |
| 6,005,191 A * | 12/1999 | Tzeng | H01B 11/10 174/102 R |
| 2007/0128925 A1* | 6/2007 | Graeve | H02G 15/1806 439/523 |
| 2008/0248226 A1* | 10/2008 | Simon | B29D 23/001 428/34.9 |

OTHER PUBLICATIONS

International Search Report and Written Opinion issued by the European Patent Office, Rijswijk, Netherlands, dated Mar. 27, 2013, for International Application No. PCT/EP2013/053890; 8 pages.

Extended European Search Report issued by the European Patent Office, Rijswijk, Netherlands, dated Apr. 20, 2012, for European Patent Application No. EP 12 15 8265; 6 pages.

* cited by examiner

MULTI-LAYER HEAT SHRINKABLE TUBULAR SLEEVE

BACKGROUND

The present invention relates to a multi-layer heat-shrinkable tubular sleeve according to claim 1, to a cable termination comprising a multi-layer heat-shrinkable tubular sleeve according to claim 13, to a cable joint comprising a multi-layer heat-shrinkable tubular sleeve according to claim 14 and to a method for producing a multi-layer heat-shrinkable tubular sleeve according to claim 15.

It is known in the state of the art to provide energy cables with a voltage rating of 6 kV or higher with cable insulations comprising inner and outer conductive layers for electrical stress minimization. In order to create connections in cable terminations or cable joints, the outer conductive layer has to be removed. This creates an area of enhanced electric fields at the edge of the outer conductive layer. In order to guarantee safe operation, that field has to be attenuated using appropriate means, such that no discharges can occur. This attenuation of the electric field is referred to as electrical stress control.

It is known in the state of the art to use heat-recoverable tubular sleeves with suitable material parameters, especially suitable electrical conductivity and permittivity, to grade the electric field. In the state of the art such tubular sleeves are used in cable terminations and cable joints. These sleeves are typically shrunk into position around the ends of cables that have been electrically connected together.

During installation of these products an electrical interface between the cable and the product is created. It is known in the state of the art that the quality of the electrical interface improves when a radial pressure exerted by the tubular sleeve is increased. Advancing optimization of the cables, decreasing wall thicknesses and tightened inspection requests require a further improvement of such interfaces.

It is also known in the state of the art to use several separate heat-recoverable tubular sleeves on top of each other to provide several functions as stress control, insulation or durability against environmental stresses. This however requires additional work steps during the installation of the cable connections.

The EP 1 702 391 B1 describes a heat-shrinkable jointing with an inner layer, a mid-layer and an outer layer. The outer layer may comprise a small quantity of a high density polyethylene.

From the U.S. Pat. No. 5,013,894 it is known to provide a tubular sleeve comprising a conductive polymeric material with two or more elongate electrodes extending at least part way along the length of the sleeve. The electrodes can be connected to a source of electrical power to cause electrical current to flow between the electrodes around the circumference of the sleeve in order to heat up and shrink the sleeve.

SUMMARY

It is an object of the present invention to provide an improved multi-layer heat-shrinkable tubular sleeve. This objective is achieved by a multi-layer heat-shrinkable tubular sleeve according to claim 1. It is a further object of the present invention to provide an improved cable termination comprising a multi-layer heat-shrinkable tubular sleeve. This objective is achieved by means of a cable termination according to claim 13. It is a further object of the present invention to provide an improved cable joint comprising a multi-layer heat-shrinkable tubular sleeve. This objective is achieved by a cable joint according to claim 14. It is a further object of the present invention to provide a method for producing a multi-layer heat-shrinkable tubular sleeve. This objective is achieved by a method according to claim 15. Preferred embodiments are disclosed in the dependent claims.

A multi-layer heat-shrinkable tubular sleeve according to the invention comprises an outer layer and an inner layer. The outer layer is arranged around the inner layer and comprises a partially crystalline thermoplastic material with a major part of partially crystalline thermoplastic material with a crystallinity of more than 60%. The partially crystalline thermoplastic material with a crystallinity of more than 60% may for example be a polyoxymethylene-homopolymer with a crystallinity of about 90%, a polyoxymethylene-copolymer with a crystallinity of about 75%, a polytetrafluoreethylene (PTFE) with a crystallinity of about 75%, a polytetrafluoreethylene (PTFE) with a crystallinity of 60% to 80%, an isotactic polypropylene (PP) with a crystallinity of 70% to 80%, or a high density polyethylene (PE-HD or HDPE) with a crystallinity of 70% to 80%. Advantageously, an outer layer composed of such materials is suited for exerting an enhanced contact pressure on the inner layer.

Preferably the outer layer comprises a thickness of less than 10% of the thickness of the inner layer, for example the outer layer may comprise a radial thickness of at least 0.2 mm.

The inner layer comprises a partially crystalline thermoplastic material or an elastomeric material. Advantageously, the outer layer of this tubular sleeve is capable of exerting an enhanced contact pressure on the inner layer and thus also a cable interface, thereby improving the quality of the electrical interface. A further advantage of this tubular sleeve is that installation of the tubular sleeve requires no additional work steps as compared to the installation of a conventional tubular sleeve. A further advantage of the tubular sleeve is that installation of the tubular sleeve is straight forward and easy, assuring a high installation reliability.

According to one embodiment, the inner layer comprises a thermoplastic material. Advantageously, the inner layer may then also exert a contact pressure on an interface enclosed by the sleeve.

According to one embodiment, the inner layer comprises an elastomeric material. Advantageously, the inner layer may then elastically follow an expansion and recovery of the outer layer of the sleeve.

In a preferred embodiment of the sleeve the major part of the material of the outer layer is a high density polyethylene comprising a crystallinity between 70% and 80%.

It is preferred, that the outer layer comprises a density of at least 0.94 g/cm$^3$ (gramm per cubic centimeter). Advantageously, the outer layer is then suited for exerting an enhanced contact pressure on the inner layer.

In one embodiment of the tubular sleeve, the outer layer is deposited on the inner layer by means of co-extrusion. Advantageously, this allows for a cost efficient production of the sleeve.

In one embodiment of the sleeve, the outer layer comprises an electrical resistivity of at least 1 TΩ·cm (teraohm times centimeter). Advantageously, the outer layer is then electrically insulating.

It is preferred that the outer layer comprises a comparative tracking index of at least 600. Advantageously, the outer layer is then non-tracking and prevents degradation of the outer layer in case of the occurrence of creepage currents in the presence of humidity.

According to another embodiment of the sleeve, the outer layer comprises an electrical resistivity between 10 MΩ·cm (megaohm times centimeter) and 1 TΩ·cm (teraohm times centimeter), preferably between 50 GΩ·cm (gigaohm times centimeter) and 1 TΩ·cm (teraohm times centimeter), and/or the outer layer comprises a relative permittivity of at least 5, preferably at least 10, most preferably at least 15. Advantageously, the outer layer of the sleeve is then stress-grading.

According to one embodiment, the inner layer comprises an electrical resistivity between 10 MΩ·cm and 1 TΩ·cm, preferably between 50 GΩ·cm and 1 TΩ·cm, and/or the inner layer comprises a relative permittivity of at least 5, preferably at least 10, most preferably at least 15. Advantageously, the inner layer is then electrically stress-grading.

According to an alternative embodiment of the sleeve, the inner layer comprises an electrical resistivity of less than 100 Ω·cm (ohm times centimeter). Advantageously, the inner layer is then conductive.

According to a further development, the sleeve comprises an outermost layer that is arranged around the outer layer. Advantageously, the outermost layer may be created using co-extrusion. A further advantage is that the outermost layer may serve to fulfil additional requirements applied to the tubular sleeve.

In one embodiment, the outermost layer comprises a thermoplastic material. Advantageously, the outermost layer may then help to exert an enhanced contact pressure on the inner layer of the sleeve.

In one embodiment, the outermost layer comprises an electrical resistivity of at least 1 TΩ·cm. Advantageously, the outermost layer of the sleeve is then electrically insulating.

According to a further development, the outermost layer comprises a comparative tracking index of at least 600. Advantageously, the outermost layer is then electrically non-tracking, preventing the occurrence of degradation of the outermost layer in case of creepage currents in the presence of humidity.

According to an alternative embodiment, the outermost layer comprises an electrical resistivity of less than 100 Ω·cm. Advantageously, the outermost layer of the sleeve is then electrically conductive.

According to an alternative embodiment of the sleeve, the sleeve comprises an innermost layer, wherein the inner layer is arranged around the innermost layer. Advantageously, the innermost layer may then fulfil an additional requirement applied to the tubular sleeve.

According to a further development, the innermost layer comprises an elastomeric material. Advantageously, the innermost layer may then elastically follow an extension and recovery of the outer layer and the inner layer of the sleeve.

According to one embodiment, the innermost layer comprises an electrical resistivity of at least 1 TΩ·cm. Advantageously, the innermost layer is then electrically insulating.

According to an alternative embodiment, the innermost layer comprises an electrical resistivity between 10 MΩ·cm and 1 Ω·cm, preferably between 50 GΩ·cm and 1 TΩ·cm. Advantageously, the innermost layer is then electrically stress-grading.

According to a further development of the sleeve, the outer layer comprises two elongate electrodes extending at least part way along the sleeve. Advantageously, the elongate electrodes may then be connected to a power source to drive an electric current through the electrodes and the outer layer of the sleeve to heat and thermally shrink the outer layer of the sleeve.

A cable termination according to the invention comprises a multi-layer heat-shrinkable tubular sleeve of the aforementioned kind. Advantageously, the tubular sleeve may then exert an enhanced contact pressure on an electric connection of the cable termination to improve the electric properties of the cable termination.

A cable joint according to the invention comprises a multi-layer heat-shrinkable tubular sleeve of the aforementioned kind. Advantageously, the tubular sleeve may then exert an enhanced contact pressure on an electric interface of the cable joint to improve the electric properties of the cable joint.

A method for producing a multi-layer heat-shrinkable tubular sleeve according to the invention comprises steps of co-extruding an inner layer and an outer layer of the sleeve, wherein the outer layer is arranged around the inner layer, of cross-linking the sleeve material, and of expanding the sleeve. Advantageously, this method provides a simple and cost-efficient way of manufacturing a multi-layer heat-shrinkable tubular sleeve.

BRIEF DESCRIPTION OF THE DRAWINGS

The invention will now be explained in more detail with reference to the Figures, in which.

DETAILED DESCRIPTION

Figure 1:
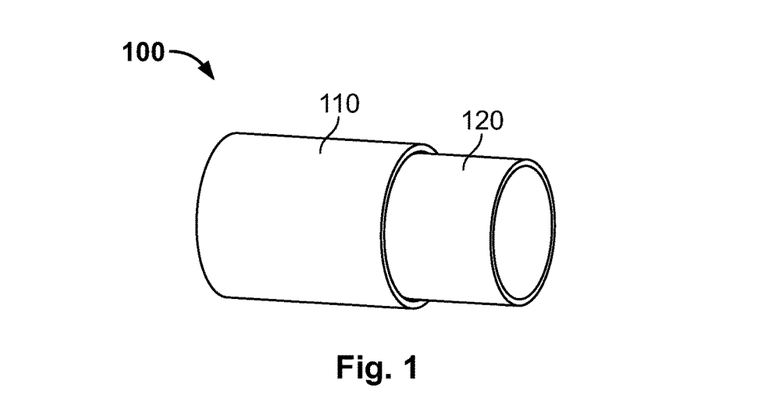
FIG. 1 shows a schematic representation of a tubular sleeve according to one embodiment.

FIG. 1 shows a schematic representation of a multi-layer heat-shrinkable tubular sleeve 100 in a perspective view. The tubular sleeve 100 comprises an outer layer 110 and an inner layer 120. The inner layer 120 and the outer layer 110 are conjoined. The outer layer 120 is arranged around the inner layer 110.

The tubular sleeve 100 may for example be used in a joint or a termination for an electrical power cable. The electrical power cable may for example be designed for being used with operation voltages of or above 6 kV (kilovolts). The power cable may be a low voltage power cable, a medium voltage power cable or a high voltage power cable designed for voltages above 42 kV.

The tubular sleeve 100 may be shrunk into position around the ends of two electrical power cables that have been electrically connected together. The tubular sleeve 100 may also be used in a cable termination.

The multi-layer heat-shrinkable tubular sleeve 100 is preferably of tubular, one-piece construction. The term tubular is used to indicate an elongate hollow article, which may be a substantially straight sleeve of substantially uniform round or oval cross-section, but is not necessarily limited to any particular longitudinal outline or uniformity of transverse dimension.

The tubular sleeve 100 may be manufactured efficiently by co-extrusion. However, layered moldings are not excluded and will often be preferable for articles of more complex shape. After co-extrusion or molding, the material constituting the outer layer 110 and/or the inner layer 120 may be cross-linked by heating up the tubular sleeve 100. In a following process step the tubular sleeve 100 may be expanded radially to enable a later recovery of the tubular sleeve 100.

In a first embodiment, the outer layer 110 may comprise an electrically insulating material that is electrically non-tracking and is provided for exerting an enhanced contact pressure on the inner layer 120 when the tubular sleeve 100 has been heat-shrunk or recovered and thus also for exerting an enhanced contact pressure on a cable interface that is arranged in the tubular sleeve 100. In this first embodiment, the inner layer 120 may comprise a thermoplastic material that is electrically stress-grading.

A material may be regarded as electrically insulating if the material comprises an electrical resistivity of at least 1 TΩ·cm (teraohm times centimeter). According to the first embodiment, the outer layer 110 therefore comprises an electrical resistivity of at least 1 TΩ·cm.

A material may be regarded as electrically non-tracking if the material comprises a comparative tracking index of at least 600. The comparative tracking index indicates a voltage level that still results in a sufficiently low degradation of the material in case of creepage current in the presence of humidity or wetness.

On the basis of the so called Barlow's Formula, an equation for the long term hydrostatic pressure resistance on pipes, a radial pressure p is proportional to a stress S in a tubular material: $p=2\,S\,t/D$, wherein t is the wall thickness and D is the diameter of the tube. The stress S is defined by the force per area. Thus, the pressure exerted on the cable interface is proportional to the tangential force the tubular sleeve 100 can reach. Consequently, to assess a relative enhancement of different materials, a simple tension test on a ring cut of the tubular sleeve to measure the force during cooling is sufficient.

Figure 6:
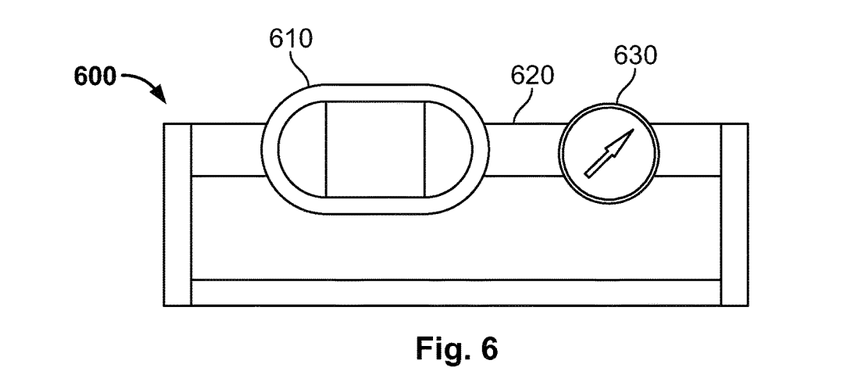
FIG. 6 shows a schematic test setup to perform a tension test.

FIG. 6 shows a schematic tension force measurement setup 600 to perform such a tension test. A ring 610 cut from a tubular heat shrink sleeve is put into a tension tester 620 and heated to 150° C. to start the heat shrink process. A force 630 applied to the tension tester 620 is recorded during cooling (recrystallisation) of the ring 610.

Samples of the same overall cross section area are tested and compared with each other. A sample that shows a higher force after 60 minutes of cooling time is suitable to exert an enhanced contact pressure to an interface.

We define that a multi-layer tubular sleeve exerts an enhanced contact pressure if that multi-layer sleeve shows at least a 25% higher, preferably a 50% higher, force 630 in a simple tension test compared to a single-layer sleeve of the same base material with the same cross section.

In other words, the outer layer 110 of the tubular sleeve 100 may be regarded as being suitable to exert an enhanced contact pressure on the inner layer 120 of the tubular sleeve 100 if the tubular sleeve 100 exerts a contact pressure after heat-shrinking of the tubular sleeve 100 that is at least 25%, preferentially at least 50%, higher than a contact pressure exerted by a tubular sleeve with an outer layer that comprises the same material as the inner layer, provided that both tubular sleeves comprise the same thickness.

According to the first embodiment, the outer layer 110 comprises a major part of partially crystalline thermoplastic material with a crystallinity of more than 60%. The term major part means that among all individual components of the material of the outer layer 110, the partially crystalline thermoplastic material with a crystallinity of more than 60% is the biggest component by weight.

In a preferred embodiment of the invention the major part of the material of the outer layer is preferably a high density polyethylene comprising a crystallinity between 70% and 80%. High density polyethylenes are heat-shrinkable (heat-recoverable) thermoplastic materials from the class of polyolefins. A tubular sleeve layer composed from such a thermoplastic material with a high crystallinity is suited for exerting a high contact pressure on the inner layer.

It is further preferred that the material of the outer layer 110 comprises a density of at least 0.94 g/cm$^3$ (gramm per cubic centimeter). It is known that the density of high density polyethylene is linked to the crystallinity of the high density polyethylene. The higher the crystallinity, the higher the density and the higher the possible contact pressure exerted by a tubular sleeve layer composed of that material.

The outer layer 110 of the tubular sleeve 100 is capable of exerting an enhanced contact pressure on the inner layer 120 of the tubular sleeve 100 because the outer layer 110 comprises a major part of partially crystalline thermoplastic material with a crystallinity of more than 60%. Experiments have shown this surprising effect. A layer comprising a smaller fraction of partially crystalline thermoplastic material with a crystallinity of more than 60% or a layer comprising only material with a lower crystallinity is not suited for exerting an enhanced contact pressure.

According to the first embodiment, the inner layer 120 is composed of a thermoplastic stress-grading material.

A material may be regarded as electrically stress-grading if the material comprises an electrical resistivity between 10 MΩ·cm (megaohm times centimeter) and 1 TΩ·cm (teraohm times centimeter), preferably between 50 GΩ·cm (gigaohm times centimeter) and 1 TΩ·cm. A material may also be regarded as electrically stress-grading if the material comprises a relative permittivity of at least 5, preferably at least 10, most preferably at least 15.

The inner layer 120 of the tubular sleeve 100 according to the first embodiment may for example be comprised of 35% by weight of chlorinated polyethylene,
20% by weight of low density polyethylene,
40% by weight of thermal and semiconductive carbon blacks,
4.5% by weight of antioxidants and stabilizers, and
0.5% by weight of cross-linking promoters.

In a second embodiment of the present invention the outer layer 110 of the tubular sleeve 100 may be composed of the same material as the outer layer 110 of the tubular sleeve 100 according to the first embodiment discussed above.

The inner layer of the tubular sleeve 100 according to the second embodiment comprises an electrically stress-grading elastomeric material. The inner layer 120 of the tubular sleeve 100 according to the second embodiment may for example comprise 55% by weight of ethylene-propylene-diene-monomer elastomer,
40% by weight of thermal and semiconductive carbon blacks,
4.5% by weight of antioxidants and stabilizers, and
0.5% by weight of cross-linking promoters.

According to a third embodiment, the outer layer 110 of the tubular sleeve may comprise a thermoplastic material that is electrically stress-grading and capable of exerting an enhanced contact pressure on the inner layer 120. The material of the outer layer 110 comprises a major part of partially crystalline thermoplastic material with a crystallinity of more than 60%.

According to the third embodiment, the inner layer 120 of the tubular sleeve 100 may comprise an electrically stress-grading elastomeric material. The inner layer 120 may comprise the same material as the inner layer 120 of the tubular sleeve 100 according to the second embodiment disclosed above.

According to a fourth embodiment of the present invention, the outer layer 110 of the tubular sleeve 100 may comprise a thermoplastic electrically insulating and electrically non-tracking material that is capable of exerting an enhanced contact pressure on the inner layer 120 of the tubular sleeve. The material of the outer layer 110 comprises a major part of partially crystalline thermoplastic material with a crystallinity of more than 60%. The outer layer 110 of the tubular sleeve 100 according to the fourth embodiment may for example comprise the same material as the outer layer 110 of the tubular sleeve 100 according to the first embodiment disclosed above.

According to the fourth embodiment, the inner layer 120 of the tubular sleeve 100 may comprise an electrically conductive thermoplastic material.

A material may be regarded as being electrically conductive if the material comprises an electrical resistivity of less than 100 Ω·cm (ohm times centimeter).

The inner layer 120 of the tubular sleeve 100 according to the fourth embodiment therefore comprises an electrical resistivity of less than 100 Ω·cm. The inner layer 120 of the tubular sleeve 100 may for example comprise 60% to 70% by weight of an ethylene-vinyl-acetate copolymer,
10% to 20% by weight of high density polyethylene,
15% to 25% by weight of conductive carbon black and
1% to 2% by weight of aromatic amine antioxidant.

The individual components of the material may be selected from the specified ranges to total 100%.

Figure 2:
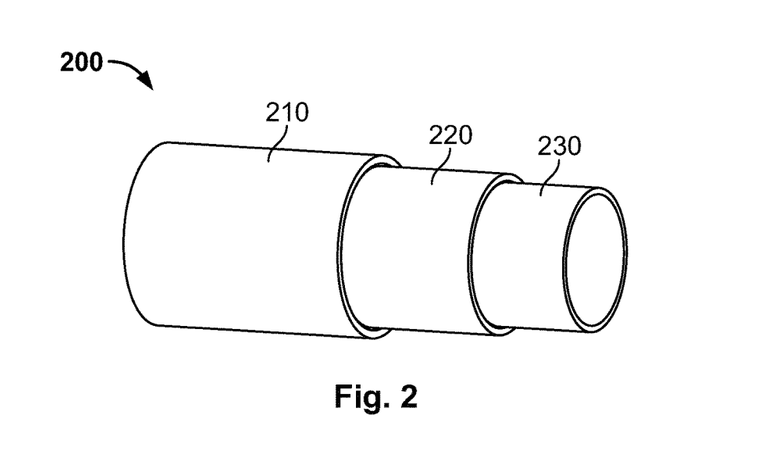
FIG. 2 shows a schematic representation of a tubular sleeve according to a further embodiment.

FIG. 2 schematically shows a perspective view of a tubular sleeve 200 according to further embodiments of the invention. The tubular sleeve 200 comprises an outer layer 210, an inner layer 220 and an innermost layer 230. The outer layer 210, the inner layer 220 and the innermost layer 230 of the tubular sleeve 200 are conjoined. The inner layer 220 is arranged around the innermost layer 230. The outer layer 210 is arranged around the inner layer 220.

The tubular sleeve 200 is preferably of tubular, one-piece construction. The term tubular is used to indicate an elongate hollow article, which may be a substantially straight sleeve of substantially uniform around or oval cross-section, but is not necessarily limited to any particular longitudinal outline or uniformity of transverse dimension.

The tubular sleeve 200 may be manufactured efficiently by co-extrusion. However, layered moldings are not excluded and will often be preferable for tubular sleeves of more complex shape.

According to a fifth embodiment, the outer layer 210 of the tubular sleeve 200 may comprise a thermoplastic material that is electrically insulating and electrically non-tracking and capable of exerting an enhanced contact pressure on the inner layer 220 of the tubular sleeve 200. The material of the outer layer 210 comprises a major part of partially crystalline thermoplastic material with a crystallinity of more than 60%. The outer layer 210 of the tubular sleeve 200 according to the fifth embodiment may for example comprise the same material as the outer layer 110 of the tubular sleeve 100 according to the first embodiment.

According to the fifth embodiment, the inner layer 220 may comprise an elastomeric material that is electrically insulating. The inner layer 220 of the tubular sleeve 200 according to the fifth embodiment may for example comprise 40% to 50% by weight of ethylene propylene diene monomer rubber,
10% to 20% by weight of polyisobutylene,
25% to 40% by weight of a filler material,
2% to 5% by weight of process aids,
3% to 7% by weight of the stabilizers, and
3% to 5% by weight of cross-linking agents.

The individual components of the material of the inner layer 220 of the tubular sleeve 200 according to the fifth embodiment may be selected from the specified ranges to total 100%.

The innermost layer 230 of the tubular sleeve 200 according to the fifth embodiment comprises an elastomeric material that is electrically stress-grading. The innermost layer 230 of the tubular sleeve 200 according to the fifth embodiment may for example comprise the same material as the inner layer 120 of the tubular sleeve 100 according to the second embodiment disclosed above.

According to a sixth embodiment, the outer layer 210 of the tubular sleeve 200 comprises a thermoplastic material that is electrically insulating and electrically non-tracking and capable of exerting an enhanced contact pressure on the inner layer 220. The material of the outer layer 210 comprises a major part of partially crystalline thermoplastic material with a crystallinity of more than 60%. According to the sixth embodiment, the outer layer 210 may for example comprise the same material as the outer layer 110 of the tubular sleeve 100 according to the first embodiment disclosed above.

According to the sixth embodiment, the inner layer 220 of the tubular sleeve 200 and the innermost layer 230 of the tubular sleeve 200 both comprise an elastomeric material that is electrically insulating. The inner layer 220 and the innermost layer 230 may or may not comprise the same material. The inner layer 220 and/or the innermost layer 230 of the tubular sleeve 200 according to the sixth embodiment may for example comprise the same material as the inner layer 220 of the tubular sleeve 200 according to the fifth embodiment disclosed above.

Figure 3:
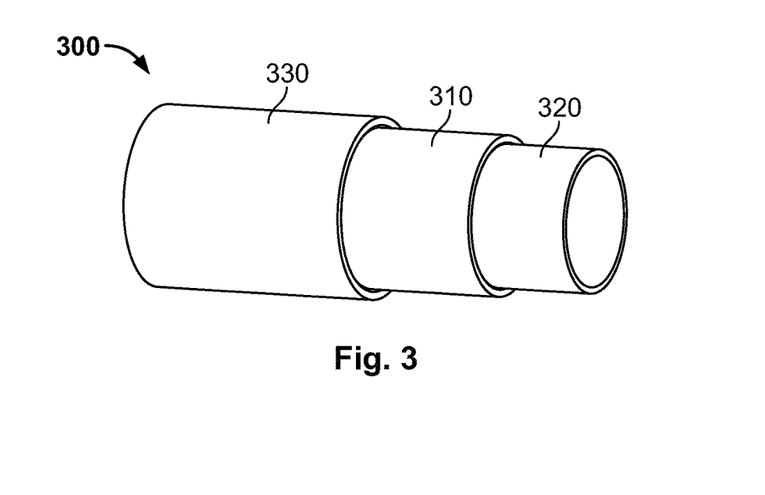

FIG. 3 schematically depicts a tubular sleeve 300 according to further embodiments. The tubular sleeve 300 comprises an outer layer 310, an inner layer 320 and an outermost layer 330. The outermost layer 330, the outer layer 310 and the inner layer 320 of the tubular sleeve 300 are conjoined and preferably of tubular, one-piece construction. The outermost layer 330 is arranged around the outer layer 310. The outer layer 310 is arranged around the inner layer 320.

Again, the term tubular is used to indicate an elongated hollow article, which may be a substantially straight sleeve of substantially uniform around or oval cross-section, but is not necessarily limited to any particular longitudinal outline or uniformity of transverse dimensions. The tubular sleeve 300 may be manufactured efficiently by co-extrusion. However, layered moldings are not excluded.

According to a seventh embodiment, the outermost layer 330 of the tubular sleeve 300 comprises a thermoplastic material that is electrically conductive. The outermost layer 330 may for example comprise the same material as the inner layer 120 of the tubular sleeve 100 according to the fourth embodiment described above.

The outer layer 310 of the tubular sleeve 300 according to the seventh embodiment comprises a thermoplastic material that is electrically insulating and capable of exerting an enhanced contact pressure on the inner layer 320. The material of the outer layer 310 comprises a major part of partially crystalline thermoplastic material with a crystallinity of more than 60%. The inner layer 320 of the tubular sleeve 300 according to the seventh embodiment comprises an elastomeric material that is electrically stress-grading. The inner layer 320 of the tubular sleeve 300 according to the seventh embodiment may for example comprise the same material as the inner layer 120 of the tubular sleeve 100 according to the second embodiment described above.

According to an eighth embodiment, the outermost layer 330 of the tubular sleeve 300 may comprise a thermoplastic material that is electrically insulating and electrically non-tracking. The outermost layer 330 of the tubular sleeve 300 according to the eight embodiment may for example comprise 60% to 70% by weight of a linear low density polyethylene, 30% to 40% by weight of a filler material, and 1% to 2% by weight of stabilizers.

The individual components may be chosen from the specified ranges to total 100%.

The outer layer 310 of the tubular sleeve 300 according to the eighth embodiment comprises a thermoplastic material that is electrically insulating and capable of exerting an enhanced contact pressure on the inner layer 320 of the tubular sleeve 300. The material of the outer layer 310 comprises a major part of partially crystalline thermoplastic material with a crystallinity of more than 60%. The outer layer 310 of the tubular sleeve 300 according to the eighth embodiment may for example comprise the same material as the outer layer 310 of the tubular sleeve 300 according to the seventh embodiment described above.

The inner layer 320 of the tubular sleeve 300 according to the eighth embodiment comprises a thermoplastic material that is electrically stress-grading. The inner layer 320 of the tubular sleeve 300 according to the eighth embodiment may for example comprise the same material as the inner layer 120 of the tubular sleeve 100 according to the first embodiment disclosed above.

According to a ninth embodiment, the outermost layer 330 of the tubular sleeve 300 comprises a thermoplastic material that is electrically insulating and electrically non-tracking. The outermost layer 330 of the tubular sleeve 300 of the ninth embodiment may for example comprise the same material as the outermost layer 330 of the tubular sleeve 300 according to the eighth embodiment described above.

The outer layer 310 of the tubular sleeve 300 according to the ninth embodiment comprises a thermoplastic material that is electrically insulating and capable of exerting an enhanced contact pressure on the inner layer 320. The material of the outer layer 310 comprises a major part of partially crystalline thermoplastic material with a crystallinity of more than 60%. The outer layer 310 of the tubular sleeve 300 according to the ninth embodiment may for example comprise the same material as the outer layer 310 of the tubular sleeve 300 according to the eighth embodiment described above.

The inner layer 320 of the tubular sleeve 300 according to the ninth embodiment comprises an elastomeric material that is electrically stress-grading. The inner layer 320 of the tubular sleeve 300 according to the ninth embodiment may for example comprise the same material as the inner layer 120 of the tubular sleeve 100 according to the second embodiment described above.

The tubular sleeves 100, 200, 300 according to the embodiments described above are each composed of multiple layers of which at least one layer each is heat-recoverable. The various layers of each tubular sleeves 100, 200, 300 perform different functions within the tubular sleeves 100, 200, 300. Each tubular sleeve 100, 200, 300 according to the embodiments described above comprises at least one layer that exerts an enhanced contact pressure on other layers located further inwards of the respective tubular sleeve 100, 200, 300 and therefore also onto an electrical interface of an electrical cable accessory that is equipped with the tubular sleeve 100, 200, 300. The electrical cable accessory could be a cable termination or a joint or splice. The enhanced recovery force is important as it creates a much more reliable electrical interface.

Figure 4:
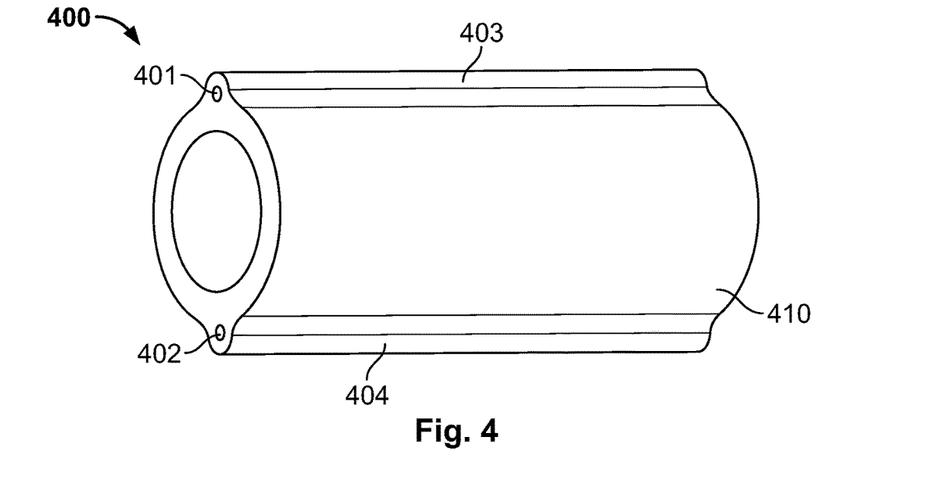
FIG. 4 shows a schematic representation of a tubular sleeve according to a further embodiment.

FIG. 4 schematically shows a tubular sleeve 400 according to a further embodiment. FIG. 4 shows only an outer or outermost layer 410 of the tubular sleeve 400. The tubular sleeve 400 may either be designed as the tubular sleeve 100 of FIG. 1 in which case the outer layer 410 of the tubular sleeve 400 corresponds to the outer layer 110 of the tubular sleeve 100. The tubular sleeve 400 may also be developed as the tubular sleeve 200 of FIG. 2, in which case the outer layer 410 of the tubular sleeve 400 corresponds to the outer layer 210 of the tubular sleeve 200. The tubular sleeve 400 may also be developed as the tubular sleeve 300 of FIG. 3, in which case the outer layer 410 of the tubular sleeve 400 corresponds to the outermost layer 330 of the tubular sleeve 300.

The outer layer 410 comprises a thermoplastic heat-shrinkable material.

The outer layer 410 of the tubular sleeve 400 comprises a first flange 403 and a second flange 404. Each of the flanges 403, 404 extend along the longitudinal direction of the tubular sleeve 400. The flanges 403, 404 are both arranged on an outer circumference of the outer layer 410 of the tubular sleeve 400. The first flange 403 and the second flange 404 are located at radially opposing positions of the outer layer 410 of the tubular sleeve 400.

Embedded in the first flange 403 is a first wire 401. Embedded in the second flange 404 is a second wire 402. The first wire 401 and the second wire 402 are both electrically conductive. A power source not shown in FIG. 4 may be connected to the first wire 401 and the second wire 402 to apply an electric voltage between the first wire 401 and the second wire 402. Applying a voltage between the wires 401, 402 causes an electric current to flow through the outer layer 410 of the tubular sleeve 400 between the wires 401, 402. The electric current generates heat which causes the outer layer 410 of the tubular sleeve 400 to thermally recover and heat-shrink. The first wire 401 and the second wire 402 embedded in the first flange 403 and the second flange 404 may therefore serve to heat-shrink the tubular sleeve 400. The tubular sleeves 100, 200, 300 of FIGS. 1 to 3 may be equipped with wires as the tubular sleeve 400 shown in FIG. 4.

Figure 5:
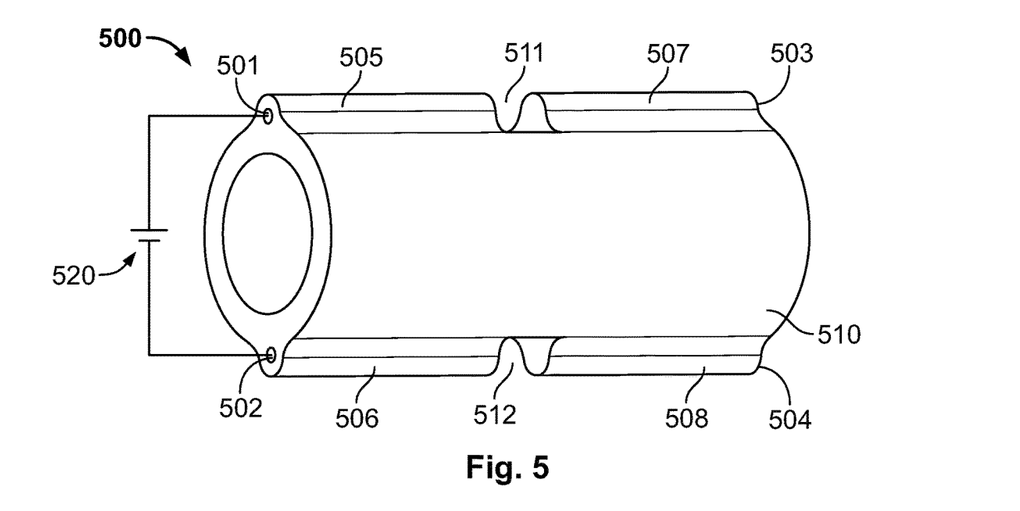
FIG. 5 shows a schematic representation of a tubular sleeve according to yet a further embodiment.

FIG. 5 shows a schematic representation of a tubular sleeve 500 according to a further embodiment. The tubular sleeve 500 is a multi-layer heat-shrinkable tubular sleeve comprising several layers. FIG. 5 shows only an outer layer 510 of the tubular sleeve 500. The tubular sleeve 500 may be designed as the tubular sleeve 100 shown in FIG. 1. In this case the outer layer 510 of the tubular sleeve 500 corresponds to the outer layer 110 of the tubular sleeve 100. The tubular sleeve 500 may also be designed as the tubular sleeve 200 of FIG. 2. In this case the outer layer 510 of the tubular sleeve 500 of FIG. 5 corresponds to the outer layer 210 of the tubular sleeve 200 of FIG. 2. The tubular sleeve 500 of FIG. 5 may also be designed as the tubular sleeve 300 of FIG. 3. In this case the outer layer 510 of the tubular sleeve 500 corresponds to the outermost layer 330 of the tubular sleeve 300.

The outer layer 510 comprises a thermoplastic heat-shrinkable material.

The outer layer 510 comprises a first flange 505, a second flange 506, a third flange 507 and a fourth flange 508. Each of the flanges 505, 506, 507, 508 extend along a longitudinal direction of the outer layer 510. All flanges 505, 506, 507, 508 are arranged on an outer circumference of the outer layer 510. The first flange 505 and the third flange 507 are longitudinally arranged one after another and are separated by a first notch 511. The second flange 506 and the fourth flange 508 are longitudinally arranged one after another and are separated by a second notch 512. The first flange 505 and the third flange 507 are arranged on a radially opposing position of the outer layer 510 with respect to the second flange 506 and the fourth flange 508.

The first flange 505 comprises a first wire 501. The second flange 506 comprises a second wire 502. The third flange 507 comprises a third wire 503. The fourth flange 508 comprises a fourth wire 504. Each wire 501, 502, 503, 504 is embedded in the respective flange 505, 506, 507, 508 and extends in the same longitudinal direction as the respective flange 505, 506, 507, 508.

A power source 520 may be connected to the first wire 501 and the second wire 502 to apply a voltage between the first wire 501 and the second wire 502. Application of a voltage between the first wire 501 and the second wire 502 causes an electric current to flow between the first wire 501 and the second wire 502 via the outer layer 510 of the tubular sleeve 500, thereby generating heat to heat-shrink the outer layer 510 of the tubular sleeve 500.

The first notch 511 and the second notch 512 prevent the electric currents to flow also via the third wire 503 and the fourth wire 504 when the power source 520 is connected to the first wire 501 and the second wire 502. Consequently, driving a current between the first wire 501 and the second wire 502 heat-shrinks only a part of the outer layer 510 of the tubular sleeve 500 that is arranged between the first wire 501 and the second wire 502. The part of the outer layer 510 of the tubular sleeve 500 that is arranged between the third wire 503 and the fourth wire 504 remains expanded and does not shrink. In order to shrink that part of the tubular sleeve 500, the power source 520 may be connected to the third wire 503 and the fourth wire 504 to drive a current between the third wire 503 and the fourth wire 504 through the outer layer 510 of the tubular sleeve 500.

The tubular sleeve 500 shown in FIG. 5 may be produced as the tubular sleeve 400 shown in FIG. 4. In a following production step, the first notch 511 and the second notch 512 may be created to separate the first wire 501 from the third wire 503 and the second wire 502 from the fourth wire 504.

The invention claimed is:

1. A multi-layer heat-shrinkable tubular sleeve comprising an outer layer and an inner layer,
   wherein the outer layer is adjacently arranged around the inner layer, the outer layer defines an outermost surface of the tubular sleeve and is comprised of an electrically-insulating material;
   wherein the outer layer comprises a partially crystalline thermoplastic electrically-insulating material,
   wherein the inner layer comprises a partially crystalline thermoplastic material or an elastomeric material,
   wherein the outer layer comprises a major part of partially crystalline thermoplastic material with a crystallinity of more than 60%; and
   wherein the outer layer comprises at least two elongate electrodes positioned within a portion of the outer layer and positioned radially outward from a circumference of an outer surface of the outer layer, the at least two elongate electrodes extending at least partially along the sleeve.

2. The sleeve according to claim 1, wherein the inner layer comprises a thermoplastic elastomeric material.

3. The sleeve according to claim 1, wherein the major part of the material of the outer layer comprises a crystallinity between 75% and 90%.

4. The sleeve according to claim 1, wherein the outer layer comprises a density of at least 0.94 g/cm$^3$.

5. The sleeve according to claim 1, wherein the outer layer comprises an electrical resistivity of at least 1 TΩ·cm.

6. The sleeve according to claim 1, wherein the outer layer comprises a comparative tracking index of at least 600.

7. The sleeve according to claim 1, wherein the outer layer comprises an electrical resistivity between 10 MΩ·cm and 1 TΩ·cm, preferably between 50 GΩ·cm and 1 TΩ·cm, and/or the outer layer comprises a relative permittivity of at least 5.

8. The sleeve according to claim 1, wherein the outer layer comprises an electrical resistivity between 10 MΩ·cm and 1 TΩ·cm, preferably between 50 GΩ·cm and 1 TΩ·cm, and/or the outer layer comprises a relative permittivity of at least 10.

9. The sleeve according to claim 1, wherein the outer layer comprises an electrical resistivity between 10 MΩ·cm and 1 TΩ·cm, preferably between 50 GΩ·cm and 1 TΩ·cm, and/or the outer layer comprises a relative permittivity of at least 15.

10. The sleeve according to claim 1, wherein the inner layer comprises an electrical resistivity between 10 MΩ·cm and 1 TΩ·cm, preferably between 50 GΩ·cm and 1 TΩ·cm, and/or the inner layer comprises a relative permittivity of at least 5.

11. The sleeve according to claim 1, wherein the inner layer comprises an electrical resistivity between 10 MΩ·cm and 1 TΩ·cm, preferably between 50 GΩ·cm and 1 TΩ·cm, and/or the inner layer comprises a relative permittivity of at least 10.

12. The sleeve according to claim 1, wherein the inner layer comprises an electrical resistivity between 10 MΩ·cm and 1 TΩ·cm, preferably between 50 GΩ·cm and 1 TΩ·cm, and/or the inner layer comprises a relative permittivity of at least 15.

13. The sleeve according to claim 1, wherein the inner layer comprises an electrical resistivity of less than 100 Ω·cm.

14. The sleeve according to claim 1, wherein the sleeve comprises an innermost layer, wherein the inner layer is arranged around the innermost layer and the inner layer comprises an elastomeric material comprised of an electrically-insulating material.

15. The sleeve according to claim 14, wherein the innermost layer comprises an elastomeric material that is electrically stress grading.

16. The sleeve according to claim 14, wherein the innermost layer comprises an elastomeric material that is electrically insulating.

17. A cable termination comprising a multi-layer heat-shrinkable tubular sleeve according to claim 1.

18. A cable joint comprising a multi-layer heat-shrinkable tubular sleeve according to claim 1.

19. A method for producing a multi-layer heat-shrinkable tubular sleeve the method comprising steps of:
- co-extruding an inner layer and an outer layer of the sleeve, wherein the outer layer is arranged around the inner layer and is comprised of an electrically-insulating material;
- cross-linking the sleeve material;
- expanding the sleeve; and
- inserting at least two elongate electrodes within a portion of the outer layer and positioning the at least two elongate electrodes radially outward from a circumference of an outer surface of the outer layer, the at least two elongate electrodes extending at least partially along the sleeve.

* * * * *